3,639,523
BLOCK COPOLYMERS HAVING IMPROVED PHYSICAL PROPERTIES

Roy G. Hayter, Berkeley, and Eugene T. Bishop, Moraga, Calif., assignors to Shell Oil Company, New York, N.Y.
No Drawing. Filed Oct. 29, 1969, Ser. No. 872,385
Int. Cl. C08f 15/04, 15/40
U.S. Cl. 260—880                                8 Claims

ABSTRACT OF THE DISCLOSURE

The green strength, building tack, and high temperature properties of block copolymers are substantially improved by the presence of certain relatively low molecular weight polymer blocks of polymerizable monomers.

This invention is concerned with improved block copolymers. More particularly it is directed to block copolymers exhibiting substantially improved resistance to organic solvents and improved hot temperature properties while still maintaining or enhancing their other physical properties and physical characteristics.

Within the past few years, a substantial body of art has emerged concerned with block copolymers and their manufacture. They are usually formed by block copolymerizing conjugated dienes with monovinyl arenes such as styrene. They may be either linear or branched in their marcromolecular configuration and they may be utilized in their original state or derivatized such as by hydrogenation. The hydrogenation may be either selective, partial, or complete with respect to the polymerizable species. If selective, it is generally the conjugated diene polymer blocks which are first reduced since they show the greatest activity with respect to the hydrogenation catalysts normally employed for this purpose. The physical characteristics of the block copolymers are governed primarily by the weight ratio of the several species of monomers involved, by the individual block molecular weights, the identity of the polymerizable monomers and the configuration of the copolymeric molecules.

Block copolymers may be designed to behave as a "thermoplastic elastomer" or as a thermoplastic resin. This is dependent in substantial proportion upon the ratios of the individual monomer present. Thus up to 55% of monovinyl arene polymer blocks, the block polymer generally has the properties of a thermoplastic elastomer. By this is meant a polymer which behaves as a vulcanized rubber below its softening point but acts as a thermoplastic melt above the softening point. Even after being raised to such a melt temperature and thereafter cooled it resumes its properties of a vulcanized elastomer. This type of behavior is sharply contrasted to that experienced with normal rubbers which require vulcanization to attain their maximum stress-strain properties. Vulcanized rubbers such as natural rubber or polybutadiene, once vulcanized, are intractable materials which cannot be melted and processed like thermoplastic materials. Moreover, once vulcanized and shaped they cannot be put through the same recycle operations as can the thermoplastic elastomers.

Above about 55 weight percent of monovinyl arene polymer blocks, block copolymers gradually assume the properties of high impact thermoplastic material.

In spite of the impressive set of physical properties which block copolymers exhibit, they have certain limiting characteristics, one of the most serious of which is their sensitivity toward organic solvents, particularly hydrocarbons, as well as their relatively low service temperatures. Moreover, since they are essentially hydrocarbon polymers (if made from conjugated dienes and monovinyl arenes) they do not exhibit the optimum properties of polymers useful in adhesive applications. Contact with solvents may cause dissolution of the polymer or at least a high degree of swelling depending on the circumstances and species of the solvents involved as well as upon the particular block copolymer so exposed. Moreover the utility of the usual block copolymers is strictly limited in view of their relatively low softening points. It would be highly desirable to eliminate or minimize solvent sensitivity, increase the service temperature, i.e., softening points of the block polymers and improve other physical properties so as to broaden the utility of the block copolymers into many fields into which they cannot enter or only do so on a limited basis.

It is an object of the present invention to provide improved block copolymers. It is a further object of the invention to provide improved block copolymers exhibiting better high temperature properties and solvent resistance. Other objects will become apparent during the following detailed description of the invention.

Now, in accordance with the present invention, improved block copolymers are provided comprising those of the group consisting of block copolymers having three types of polymer blocks: at least one conjugated diene polymer block A having an average molecular weight between about 25,000 and 200,000; at least two monovinyl arene polymer blocks B having an average molecular weight between about 7,500 and 100,000 and, attached to the blocks B, at least two polymer blocks of certain copolymerizable polar monomers as more fully defined hereinafter, typified by vinyl pyridines, said blocks having an average molecular weight between about 1,000 and 15,000, the blocks C comprising between about 0.5 and 40% by weight of the block polymer; and hydrogenated derivatives of the above described block copolymers.

The invention thus provides both non-hydrogenated and hydrogenated block copolymers having improved physical properties with particular respect to hot temperature properties and solvent resistance. The polar polymer blocks are purposely restricted in their molecular weight so as to improve the set of physical properties without causing any damage to the physical properties possessed by block polymers having only the first two named monomers present.

Typical polymers according to the invention may be either linear or branched and may contain the polar polymer blocks at the terminals of each polymer chain; or these polar blocks may be in the interior of the chain as long as they are directly attached to a monovinyl arene block. Thus the most simple species has the block configuration poly(2-vinylpyridine)-polystyrene-polyisoprene-polystyrene-poly(2-vinylpyridine). Utilizing the symbols A for conjugated diene, B to represent a monovinyl arene polymer block, and C to represent the polar polymer block, the configurations especially contemplated in the block copolymers are as follows:

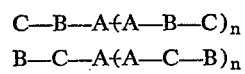

In the above general formulations, the subscript $n$ represents a whole integer between about 1 and 5. Each of the above types of block copolymers may be used as such or may be converted to relatively more stable materials by hydrogenation as stated hereinbefore.

The blocks A may be prepared especially from conjugated dienes having from 4 to 8 carbon atoms per molecule, preferably butadiene or isoprene. The polymer blocks B comprise thermoplastic polymer blocks prepared from monovinyl arenes such as styrene or alpha methyl styrene. The polar monomers from which the polar polymer blocks are prepared include vinyl pyridines and vinyl quinolines in which the vinyl group is attached to a ring carbon other than a carbon in the beta position with respect to the nitrogen.

These pyridine, quinoline, or isoquinoline derivatives can contain substituents such as alkyl, cycloalkyl, aryl, alkaryl, aralkyl, alkoxy, aryloxy, and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include 2-vinylpyridine,
4-vinylpyridine,
3,5-diethyl-4-vinylpyridine,
5-methyl-2-vinylpyridine,
5-n-octyl-2-vinylpyridine,
3-n-dodecyl-2-vinylpyridine,
3,5-di-n-hexyl-4-vinylpyridine,
5-cyclohexyl-2-vinylpyridine,
4-phenyl-2-vinylpyridine,
3,5-di-tert-butyl-2-vinylpyridine,
3-benzyl-4-vinylpyridine,
6-methoxy-2-vinylpyridine,
4-phenoxy-2-vinylpyridine,
4-dimethylamino-2-vinylpyridine,
3,5-dimethyl-4-di-methyl-4-diamylamino-2-vinylpyridine,
2-vinylquinoline,
4-vinylquinoline,
2-tert-butyl-4-vinylquinoline,
3-methyl-4-vinylquinoline,
3-cyclohexyl-4-vinylquinoline,
3-methyl-4-ethoxy-2-vinylquinoline,
1-vinylisoquinoline,
3-vinylisoquinoline,
4-tert-dodecyl-1-vinylisoquinoline,
3-dimethylamino-3-vinylisoquinoline,
4-benzyl-3-vinylisoquinolne,
4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, and the like vinylfuran and N-vinylcarbazole can also be used.

The block copolymers especially contemplated are those in which each monovinyl arene polymer block is directly attached to one polar polymer block. Preferably, the polar polymer block is positioned at all of the chain ends of the polymers but, alternatively, the polar polymer block may be positioned between a conjugated diene polymer block and a monovinyl arene polymer block. In the latter instance, the monovinyl arene polymer block will be the terminal block on each end of the polymer chains.

The object as stated hereinbefore is accomplished by using relatively low molecular weight polar polymer blocks. It is necessary to restrict the molecular weight of these blocks since if too low a molecular weight is utilized the effect obtained is insignificant. On the other hand, if a molecular weight of the polar polymer block is too high then other undesirable physical characteristics may be imparted to the polymer. Consequently, the present invention contemplates restricting the average molecular weight of the polar polymer block to between about 1,000 and 15,000, preferably between about 1,500 and 7,500. Since the principal self-vulcanizing characteristics of the block copolymer are governed by the monovinyl arene polymer blocks and their relationship to the conjugated diene elastomeric polymer block, their molecular weights also are of substantial importance. The conjugated diene polymer block should have an average molecular weight between about 25,000 and 2,000,000, preferably, between 35,000 and 100,000. The monovinyl arene polymer blocks on the other hand should have average molecular weights between about 7,500 and 100,000, preferably between 9,500 and 75,000 all as determined by viscometric and infrared techniques.

The block copolymers may be hydrogenated so as to hydrogenate any or all of the types of blocks present in the polymer chain.

The monomers according to the present invention may polymerize to yield polymer blocks which are either elastomeric or thermoplastic in their primary physical characteristics. This will depend in a substantial measure upon the individual block molecular weights. Typical block polymers coming within the scope of the present invention are as follows:

poly(2-vinylpyridine)-polystyrene-polybutadiene-polystyrene-poly(2-vinylpyridine);
poly(4-vinylpyridine)-polystyrene-polyisoprene-polystyrene-(4-vinylpyridine);
polystyrene-poly(2-vinylpyridine)-polybutadiene-poly(2-vinylpyridine)-polystyrene;
poly(2-vinylquinoline)-polystyrene-polybutadiene-polystyrene-poly(2-vinylquinoline).

The process of synthesizing the block copolymers of this invention will depend upon the desired macromolecular configuration. Essentially, the polymerization normally comprises the use of a lithium based initiator which is usually polyfunctional. This will produce a linear or branched configuration depending upon the species of the initiator and the sequence of polymerization steps. A preferred process comprises the use of a dilithio hydrocarbon compound and for this purpose an outstanding initiator is 1,4-dilithio-1,1′,4,4′-tetraphenybutane. In the usual method of employing such a difunctional initiator, the conjugated diene is first polymerized to form a conjugated diene polymer block both ends of which bear lithium anions. A second monomer is then introduced such as a monovinyl arene and block polymerization occurs on both ends of the polymer chain. Finally, the third monomer such as 2-vinylpyridine is then injected into the system and usually the temperature is lowered to effect the desired type of block polymerization. In this case, the resulting five-block polymer will have the structure

The center diene block is usually polymerized at about 25–80° C. and the first monovinyl arene can also be polymerized in the same temperature range. However, depending upon the amount of other additives present, the temperature of polymerization may be lowered to about −30° C. The last block C is added and polymerized anywhere from about −78° to +25° C. (≦12 hours to ≧1 hour). Where average temperatures of 50–60° C. are employed, overall polymerization times of 4 to 6 hours are attainable.

Branched polymers may be produced by coupling living polymer chains at the conclusion of the C polymerization stage; coupling is brought about, e.g., by the addition of a multi-functional organic coupling agent. Polymerizations are carried out in hydrocarbon solvents (cyclohexane, heptane, benzene, toluene, etc.), blended to give a solution which is liquid at the polymerization temperature employed. Ethers such as tetrahydrofuran or diethyl ether may be added as needed to effect the desired polymerization.

The block copolymers formed such as by the process just described may be hydrogenated utilizing, for example, nickel, cobalt, or iron compounds, preferably reduced with an aluminum reducing agent such as an aluminum alkoxide or an aluminum hydrocarbon compound, such as an aluminum trialkyl. Hydrogenation may be carried out at temperatures between about room temperature and 175° C. using hydrogen pressures between about 250 and 5,000 p.s.i., the time of hydrogenation varying from about several minutes to several hours. Mild conditions may be employed to selectively hydrogenate the conjugated diene polymer blocks after which temperature and pressure may be increased to encourage hydrogenation of the remaining polymer blocks if so desired. Preferably when hydrogenating at least about 80% of the conjugated diene double bonds are reduced by hydrogenation.

The block copolymers of this invention are particularly designed for use at elevated temperatures since the presence of the polar block in particular increases the softening point of the product. Furthermore, due to the presence of the polar blocks, the resistance to softening, swelling, or dissolving in organic solvents is noted. The presence of the polar sites in the block polymers of this invention also improves certain physical characteristics such as adherence of the polymer to certain surfaces such as metals, wood, paper, leather, and textiles. Furthermore, the proportion of polar blocks may be controlled to impart a desired degree of hydrophilicity if this is desired. In the polar block polymers containing nitrogen component such as the vinyl pyridines and quinolines, for example, it is possible to cause a certain amount of crosslinking if this is desired for any particular purpose. The use of polyfunctional salt forming compounds such as polyhalohydrocarbons may be useful for this purpose.

The following example illustrates the preparation of the type of polymers considered in this invention.

EXAMPLE

Two grams of metallic lithium was placed in an argon-purged bottle equipped with a glass-coated magnetic stirrer. After the addition of 17 cc. of diethyl ether and 17 cc. of diphenyl ethylene, the mixture was stirred for one hour. The resulting reaction product dissolved upon the addition of 50 cc. of benzene. After stirring the catalyst solution overnight at room temperature, it was utilized in the following polymerization. 50 grams of butadiene was condensed at −10° C. in a reactor containing 363 grams of freshly distilled toluene. Impurities were titrated with secondary butyl lithium in cyclohexane at 40° C. The polymerization started after the addition of 0.784 gram of the above prepared 1,4-dilithio-1,1′,4,4′-tetraphenyl butane in benzene-ether solution. The polymerization mixture was stirred at 50° C. Complete butadiene conversion was indicated after about three hours. The reactor was then cooled to 0° C. and 1 cc. of tetrahydrofuran was added. This caused an immediate decrease in viscosity. 22 grams of styrene, freshly distilled from sodium in vacuum was added, causing block polymerization on both ends of the growing polybutadiene chain. Complete polymerization of the styrene at 0° C. was indicated after about 90 minutes. The third type of block was formed by addition to the above reaction mixture of 1.287 grams of 2-vinylpyridine dissolved in 43 grams of toluene at −70° C. After about 12 hours the living dianions were reacted with methanol. Two products of this type were formed, utilizing the procedure just described, the molecular weight being varied by bearing the specific amounts of the individual monomers injected. The following table shows the physical properties obtained with these polymers.

TABLE I.—POLY (2 - VINYLPYRIDINE) - POLYSTYRENE-POLYBUTADIENE - POLYSTYRENE - POLY(2 - VINYLPYRIDINE)

| Sample | A | B |
|---|---|---|
| Block molecular weight×10⁻³ | 7.9–18.2–87.2–18.2–7.9 | 1.1–16.7–59.5–16.7–1.1 |
| Tensile at break, p.s.i., 23° C | 5,460 | 4,570 |
| Tensile at break, p.s.i., 70° C | 1,645 | 630 |
| Elongation at break, percent | 815 | 840 |
| 300% modulus, p.s.i., 23° C | 500 | 495 |
| 300% modulus tends to 0 at (° C.) | 88 | 84 |

We claim as our invention:

1. A block copolymer of the group consisting of copolymers having
    (a) at least one conjugated diene polymer block A having an average molecular weight between about 25,000 and about 200,000;
    (b) at least two monovinyl arene polymer blocks B having an average molecular weight between about 7,500 and about 100,000; and
    (c) at least two monovinyl pyridine polymer blocks C directly attached to blocks B, said blocks C having an average molecular weight between about 1,000 and about 15,000, the blocks C comprising between 0.5% and about 40% by weight of the block copolymer; and hydrogenated derivatives thereof.

2. A block copolymer according to claim 2 having the structure $$C-B-A(A-B-C)_n$$

wherein $n$ is an integer from 1 to 5.

3. A block copolymer according to claim 2 having the structure $$B-C-A(A-C-B)_n$$

wherein $n$ is an integer from 1 to 5.

4. A block copolymer according to claim 2 wherein the conjugated diene is butadiene.

5. A block copolymer according to claim 2 wherein the monovinyl arene is styrene.

6. A block copolymer according to claim 2 wherein the vinylpyridine is 2-vinylpyridine.

7. A block copolymer according to claim 2 having the structure poly(2-vinylpyridine) - polystyrene-polybutadiene-polystyrene-poly(2-vinylpyridine).

8. A block copolymer according to claim 2 having the structure poly(2 - vinylpyridine) - polystyrene-polyisoprene-polystyrene-poly(2-vinylpyridine).

References Cited

UNITED STATES PATENTS

| 3,567,798 | 3/1971 | Haefele et al. | 260—880 |
| 3,175,997 | 3/1965 | Hsieh | 260—880 |
| 3,149,182 | 9/1964 | Porter | 260—880 |

FOREIGN PATENTS

| 895,980 | 5/1962 | Great Britain | 260—880 |

JAMES A. SEIDLECK, Primary Examiner

U.S. Cl. X.R.

260—879 R